United States Patent [19]

Atallah et al.

[11] 4,085,325

[45] Apr. 18, 1978

[54] METHOD AND CIRCUIT FOR DETERMINING THE QUENCH CORRECTED COUNTING EFFICIENCY OF LIQUID SCINTILLATION SAMPLES

[76] Inventors: Khaled Atallah, Horwarthstrasse 17, D-8000 Munich 40; Fritz Berthold, Engelsbranderstrasse 12, D-7540 Neuenburg; Wolfgang Kolbe, Schillerstrasse 25, D-7547 Wildbad; Peter Rauschenbach, Hittostrasse 6; Helmut Simon, Egilbertstrasse 31, both of D-8050 Freising, all of Germany

[21] Appl. No.: 685,894

[22] Filed: May 12, 1976

[30] Foreign Application Priority Data

May 16, 1975 Germany .............................. 251904

[51] Int. Cl.² ............................................. G01T 1/00

[52] U.S. Cl. ................................................... 250/328
[58] Field of Search ................................ 250/328, 252

[56] References Cited

U.S. PATENT DOCUMENTS 3,560,744  2/1971  Jordan .......................... 250/328 X
4,002,909  1/1977  Packard et al. ....................... 250/328

Primary Examiner—Davis L. Willis
Attorney, Agent, or Firm—Kenyon & Kenyon

[57] ABSTRACT

The present invention relates to a method and a circuit for determining the quench corrected counting efficiencies of samples emitting beta radiation, secondary electrons or the like having an undetermined proportion of chemical and color quenching in a liquid scintillation counter using an external standard.

37 Claims, 8 Drawing Figures

METHOD AND CIRCUIT FOR DETERMINING THE QUENCH CORRECTED COUNTING EFFICIENCY OF LIQUID SCINTILLATION SAMPLES

BACKGROUND OF THE INVENTION

1. Field of the Invention

In a liquid scintillation counter, unknown radioactive samples of material which spontaneously emit electrons, are individually introduced into a sample vial or other sample receptacle in which the sample is held in a scintillator solution consisting of a solvent and a luminescent substance. The unknown material may be a spontaneous beta emission substance. The beta radiation of a radioactive isotope contained in the sample, supplies excitation energy for the solvent and luminescent substance, the beta radiation being absorbed therein. The luminescent substance when absorbing beta radiation undergoes a transition from its excited state to its ground state, emitting photons. Outside of the transparent sample vial or the like, at least one measuring transducer is provided to transform the light energy of the photons into an electrical signal. Normally the measuring transducers used are photomultipliers. In this connection it is assumed that the luminescent substance fluoresces at an energy the wavelength of which is tuned to the sensitivity of the photocathode of the photomultiplier. The higher the energy of the emitting isotope, the greater the number of molecules of luminescent substance that are excited and the greater the light intensity of the light flash caused by the respective excitation of the luminescent substance or the scintillation. The electrical signal generated by the measuring transducer normally is proportional to the light intensity and thus is proportional to the energy of the nuclear radiation which causes the excitation. Consequently, in order to discriminate between unknown sample emitters of different energy, the electrical signal generated by the measuring transducer is discriminated according to pulse height. The different pulse height ranges thus may be allocated to different energy stages of beta radiation emitting nuclides which may be contained in the respective sample of unknown material.

It is customary to suppress the noise of the photomultipliers of the measuring transducers, of which at least two are provided, by means of coincidence counting circuitry, evaluating only such events as are observed simultaneously in several measuring transducers. Furthermore, it is customary to provide at least two measuring transducers which observe the sample from diametrically opposed positions so as to obtain optimum approximation of a $4\pi$ geometry.

However, when attempting to measure nuclear radiation events, it is understood that losses occur which may be classified basically into controllable and uncontrollable losses. Controllable losses are those the specific parameters of which may be kept reasonably constant during the entire measuring process. One example among a number of possibilities is the loss due to the geometric properties of the detector. As compared to controllable losses, practically the only loss which is uncontrollable is the loss due to "quenching."

Quenching losses are classified as chemical quenching and color quenching. Quenching losses occur when the energy transfer of the nuclear radiation of the sample fails to cause the luminescent substance to emit a photon. If a disturbance occurs in the energy transfer from the unknown radiating isotope sample to the solvent and from the solvent to the luminescent, the loss is called chemical quenching. Chemical quenching occurs when a molecule of the quenching substance of the scintillator solution, which molecule may originate from impurities in the sample containing radioactive traces, absorbs the energy of the solvent or luminescent substance molecule excited by the beta radiation and passes over into the ground state without emitting any radiation, the excitation energy being transformed into heat instead of a light flash.

On the other hand color quenching occurs where photons already emitted by the luminescent substance are again captured by color substances or dyes contained in the scintillator solution and reabsorbed in the wave length range of the scintillator emission so that the respective light flash is extinguished while still in the sample.

In practice there are mixed cases of chemical and color quenching which cannot be foreseen either qualitatively or quantitatively. Further complicating the problem of determining quenching is that each new sample to be measured may considerably change the specific impurities which it contains. Chemical and color quenching reduce the light emission from the scintillator solution in an unforseeable manner, not only as regards the pulse height measured, but also with respect to the number of pulses measured. The resulting pulse height spectrum is displaced toward lower pulse heights. At the same degree of quenching, a more precise pulse height spectrum is obtained with a "purely" chemically quenched sample than with a "purely" color quenched sample.

The counting efficiency ZA refers to the ratio between the events actually counted per minute (counts per minute - cpm) according to pulse height discrimination and the real decay or disintegration events per minute (disintegrations per minute - dpm):

$$ZA = \frac{cpm}{dpm} \qquad (1)$$

The quench corrected counting efficiency ZA referred to below is understood to be the counting efficiency corrected for the losses in the solution of a liquid scintillation system, including quenching.

DESCRIPTION OF THE PRIOR ART

Although a number of known techniques exist for determining the quench corrected counting efficiency ZA, all of them are more or less unsatisfactory. Five prior art methods have been used to determine quench connected counting efficiency:

1.- The method of internal standardization;
2.- The method of the sample channels ratio (SCR);
3.- The method of coincidence counting;
4.- The "lesser pulse height analysis" method; and
5- The method of the external standard channels ratio (ESCR).

PRIOR ART INTERNAL STANDARDIZATION METHOD

When applying the technique of internal standardization, the sample is first subjected to a counting rate measurement. Then a known amount of calibrating radioactive substance is added and the sample subjected to recounting. The difference between the first and second measurements corresponds to the increase in radioactivity caused by the addition of the internal standard. The counting rate of the unknown sample can then be corrected and the disintegration rate calculated.

The reduction in the counts of the internal standard indicates the degree of quenching occurring, regardless of the proportions of chemical and color quenching, as long as the addition of the radioactive substance does not alter these proportions in an uncontrolled manner which normally can be prevented in a satisfactory manner. However, internal standardization is a slow and laborious procedure because the method calls for the sample vial or the like to be opened and accurate pipetting of the radioactive standard inserted. The opening of the sample vial in any automated way is extremely difficult, and there is the risk that the counting efficiency will be changed by condensation or evaporation of the sample itself. In addition, the sample is altered by the addition of the radioactive substance so that any isolation of the sample being measured which may become necessary, is rendered particularly difficult because of contamination by the calibrating substance.

The prior art techniques described below seek to avoid the complicated handling of the sample which the technique of internal standardization requires. The second, third and fifth methods are not concerned with a distinction between chemical and color quenching so that, when starting from a certain quench calibrating function, they have an inherent systematic error.

PRIOR ART SAMPLE CHANNELS RATIO METHOD

The technique of the sample channels ratio, SCR, determines counting efficiency by the pulse rate ratio of two pulse height discriminators or channels of the sample spectrum. See the publication of L. A. Baillie, in *Int. J. Appl. Radiat.* Isotop, 8, page 1 (1960). The pulse rate is measured in two channels simultaneously. Since the quenching effect shifts the pulse spectrum toward lower energies, the ratio between the counting rates in one channel and in the other channel is different with quenched samples than with a sample without quenching. Consequently the change in channel ratio indicates the degree of quenching.

The channel ratio and the counting efficiency of these samples are determined by a series of standard samples gradually quenched. A standard sample in this context is a liquid scintillator system to which a known quantity of radioactive substance has been added. The graded quenching in the liquid scintillator system is effected empirically by means of a known quenching substance. A calibrating function is created whereby the counting efficiency is plotted versus the sample channels ratio SCR (see FIG. 1). The counting efficiency ZA is allocated to an unknown sample at its sample channels ratio SCR value from the calibrating function.

It is a particular disadvantage of this technique that with samples of small activity and/or highly quenched samples, the SCR values very rapidly become too inaccurate because of excessively high statistical uncertainty. If acceptable accuracy is to be obtained in spite of the uncertainty, the measuring times become unreasonably long.

Another serious disadvantage of this technique is that, as mentioned above with respect to this, the third and the fifth techniques, different calibrating functions are obtained depending on the nature of the quenching, i.e. whether the samples are chemically and/or color quenched. In order to obtain accurate counting efficiency correction with this technique a separate quench correction function would be required for each kind of quenching. This is possible, however, only under the additional condition that the proportions of chemical and color quenching in any given specific sample are predictable, which is not the usual case encountered in practice.

If this circumstance is disregarded, any counting efficiency value between $ZA_F$ (assuming "pure" color quenching) and and $ZA_C$ (assuming "pure" chemical quenching) may be allocated to an unknown sample which is defined only by its SCR value (cf., FIG. 1).

PRIOR ART METHOD OF COINCIDENCE COUNTING

The technique of coincidence counting was published in a book by V. P. Guinn, *Liquid Scintillation Counting*, page 166, Pergamon Press, 1958. The technique is based on the direct calculation of the disintegration rate from the ratio between the two counting rates of each individually connected photomultiplier $N_1$ and $N_2$, respectively, and the counting rate of two photomultipliers $N_{1,2}$ in coincidence. When two photomultipliers are connected in coincidence, the overall counting efficiency of the measuring device equals the product of the individual counting efficiency $ZA_1$ of the one photomultiplier times the individual counting efficiency $ZA_2$ of the other photomultiplier ($ZA_1 \cdot ZA_2$). A sample having a disintegration rate A has a counting rate of $N_1$ for the photomultiplier counting efficiency $ZA_1$ and of $N_2$ for the photomultiplier counting efficiency $ZA_2$.

If both photomultipliers are connected in coincidence, the resulting counting rate is $N_{1,2}$. Because $N_1 = ZA_1 \cdot A$ and $N_2 = ZA_2 \cdot A$ and $N_{1,2} = ZA_1 \cdot ZA_2 \cdot A$ the total disintegration rate is:

$$A = \frac{N_1 \cdot N_2}{N_{1,2}} \qquad (2)$$

Numerator and denominator of this fraction represent net counting rates, in other words counting rates from which the background radiation has been subtracted. Coincidence counting has been used in liquid scintillation counting in order to substantially eliminate the remarkably high noise level of the individual photomultipliers. Counting rates $N_1$ and $N_2$ are not statistically certain unless the sample counting rate lies considerably above the noise of the photomultiplier. With a usual noise rate of approximately $10^4$ per minute per photomultiplier, the sample counting rates thus must be several times that of the noise rate. This condition, however, can be maintained in only a few cases.

This coincidence principle was further developed by E. Schwerdtel. See the publication, *Atomkernenergie*, 11, page 324, 1966. Schwerdtel's technique is based on the comparison of counting rates $N_{1,2,3}$ measured in triple coincidence by three photomultipliers with counting rates $N_{1,2}$ measured in double coincidence by two photomultipliers. In addition the following applies: $N_{1,2,3} = ZA_1 \cdot ZA_2 \cdot ZA_3 \cdot A$, wherein $ZA_3$ is the counting efficiency of the third photomultiplier. Assuming that all three photomultipliers have the same response, then $$ZA = \frac{N_{1,2,3}}{N_{1,2}}, \qquad (3)$$

or in other words, the counting efficiency equal the quotient resulting from the division of the triple coincidence counting rate by the double coincidence counting rate. This condition, however, is not usually fulfilled and for that reason, calibrating functions must be applied which are obtained by means of standard samples. A further disadvantage of this technique is the requirement of additional apparatus in the form of a third coincidence circuit and a third photomultiplier. Above all, measuring in triple coincidence leads to an impractical lowering of the counting efficiency in the case of nuclides of low energy or strongly quenched samples. Besides, this technique is hardly suitable for multiple labelling.

PRIOR ART OF "LESSER PULSE HEIGHT ANALYSIS"

In the technique of selecting the smaller one of two coincident photomultiplier signals, the so-called lesser pulse height analysis technique (German Offenlegungsschrfit DT-OS 2 228 267, assigned to Nuclear Chicago) the counting efficiency is determined independently of the composition and kind of scintillator material, radioactive source, sample, and nature of the quenching by means. The technique uses the smaller of two coincident photomultiplier signals, the two signals being regarded as correlated to the dependence of the decay even position locations. This smaller one of two coincident pulses represents an independent variable of a mathematical function, the solution of which yields the counting efficiency considered to be independent of the given mixing of chemical and color quenching in the respective sample.

This method so far has been described as useful only for nuclides having an energy spectrum similar to $^{14}C$ and nuclides of higher energy. It is dependent on the quantity of the activity of the sample and less suitable for lower levels of activity. It is apparent that this technique is responsive only to the pulses which have been attenuated the most. Moreover, it requires the use of a relatively complicated electronic system, including a multi-channel analyzer.

PRIOR ART METHOD OF EXTERNAL STANDARD CHANNELS

The technique of the external standard channels ratio (ESCR) (German Offenlegungsschrift DT-OS 1,598,121; U.S. Pat. No. 3,721,824) attempts to overcome the statistical shortcoming of the second technique, the sample channels ratio (SCR) technique, caused by insufficient sample activity. With this fifth technique, the channel ratio is determined by subjecting the sample to radiation from an external standard emitter (e.g., a gamma emitter, e.g., $^{137}Cs$). This radiation generates a Compton spectrum within the sample, more or less overlaying the sample spectrum. By quenching, this Compton spectrum is displaced in a manner similar to the sample spectrum.

An evaluation or analysis of the Compton spectrum in two channels and the calculation of the ratio of the counting rates of the two channels leads to the external standard channels ratio, ESCR. Analogously to the sample channels ratio (SCR) technique, a calibrating function between counting efficiency and external standard channels ratio, ESCR, is obtained by a series of standard samples quenched in different amounts. The counting efficiency ZA is determined for an unknown sample at its external standard channels ratio value, ESCR, from the calibrating function (cf., FIG. 1).

It is common to use for this value either the somewhat inaccurate gross ESCR value $^2E_1^e/^2E_2^e$ or the more accurate net ESCR value $(^2E_1^e - ^2E_1)/(^2E_1^e - ^2E_2)$. The superscript e indicates measurement of the sample with the external standard. If this index is missing, the sample was counted in the absence of an external standard. In the expression $^mE_n$ the superscript $m$ refers to the number of coincidence coupled or uncoupled photomultipliers analyzed, while subscript $n$ indicates the number 1, 2, ... of different channels provided simultaneously, and E indicates the counting rate measured per minute (cpm).

The advantages of the ESCR technique are due to the fact that the quenching correction can be automated by using a digital computer, that the technique is applicable to multiply-labeled samples, and that the measurements are reproducible. However, as with the SCR technique, the ESCR technique has the disadvantage of producing different quench correction functions in dependence on the kind of quenching (cf., FIG. 1).

The fact that the known techniques described above are not sufficiently specific as regards the nature of chemical and/or color quenching has made it necessary to look for a method to determine the quench corrected counting efficiency, allowing for the actual mixing ratio of chemical and color quenching given in a certain scintillation system and avoiding the cumbersome handling and labor investment required with the prior art technique of internal standardization.

According to the so-called Beer Lambert Law (cf. e.g., Neary and Budd, *The Current Status of Liquid Scintillation Counting*, 1970, pages 273–282, especially page 279, editor: E. D. Bransome) color quenching is positionally dependent, i.e., dependent on the place of observation. Thus, if a certain decay event is observed from different angles, especially from diametrically opposed sides, the event seen by a photomultiplier along a shorter extinction path in the scintillation solution is less quenched than when seen along a longer extinction path. On the other hand, observation of a chemically quenched event is nearly invariant with respect to the place of observation. It follows from these considerations that a universal quench correcting method is possible which would permit the automatic analysis of single-labeled or multiple-labeled samples with indefinite proportions of color and/or chemical quenching, at little labor cost.

Therefore, it is an object of the present invention to provide such a method and appropriate apparatus for carrying out the method.

SUMMARY OF THE INVENTION

It has been discovered that a method meeting this object is obtained by improving the known external standard channels ratio (ESCR) technique. The method according to the invention is readily automated.

The method according to the invention is based on the positional dependence of color quenching and the positional independence of chemical quenching so that it is a feature of the invention that the measuring transducers are disposed in different directions, from the sample emitter especially so as to be directed to the sample from diametrically opposed sides to encompass the entire solid angle from the emitter.

The invention utilizes the differences in the observed dependence of the counting efficiency ZA versus the ESCR value obtained with standard samples that are gradually quenched either chemically or by color quenching, as shown in FIG. 1 (L. S. Baillie, op. cit.).

In addition to the conventional ESCR determination, a so-called R value (R = ratio) is determined. This value is obtained, like the ESCR value, either as a "gross" value by measuring the sample in the presence of the external standard) or as "net" value, correcting numerator and denominator by subtracting the respective counting rates when the sample is measured in the absence of the external standard.

In a completely new manner a counting rate $^{1}E_n{}^e$ is used in the determination of the R value. This new counting rate is obtained from only one of the measuring transducers, yet in coincidence with the other one. The gross R value is defined as follows:

$$R = \frac{^{2}E_p^e}{^{1}E_q^e} \quad (4)$$

wherein the left superscript, as with the ESCR value, refers to the number of photomultipliers analyzed in combination in the measurement, whereas subscripts $p$ and $q$ refer to channel numbers. The letter E represents the measured counting rate per minute (cpm). The right superscript $e$ indicates that the sample is measured in the presence of the external standard. Analogously the net value R is as follows:

$$R = \frac{^{2}E_p^e - {}^{2}E_p}{^{1}E_q^e - {}^{1}E_q} \quad (5)$$

The net R value, determined by a novel measurement helps establish a new family of dependence curves R = (ESCR) between the limits of "purely" chemically and "purely" color quenched graded standard samples.

Using both families of dependencies, ZA vs. ESCR and R vs. ESCR, the respective quench corrected counting efficiency ZA which applies to the sample measured is determined in the ZA vs. ESCR dependence between the limits of "pure" chemical and "pure" color quenched samples on the basis of the two measured gross and net ESCR and R values, applying a known "arithmetic" mathematical interpolation procedure (e.g. linear or geometric interpolation).

In more general terms, in the new R vs. ESCR dependence, the ESCR value measurement as well as the R value measurement indicate a point, the position of which serves as an indication of the degree of the mixing relationship between chemical and color quenching in the ZA vs. ESCR dependence.

With the combined evaluation of the signals of two measuring transducers, it is customary with the ESCR technique either to add the two signals so that an added pulse height is obtained or to average the pulse height (German Offenlegungsschrift DT-OS 2 304 939). It is possible to provide an average combined signal of the two measuring transducers when determining the counting rate $^{2}E_n{}^e$ of the R value although other combinations, especially linear ones, appear to be feasible.

Excessive pulse heights which occur, for example, with additive circuitry as compared to the single pulse height of the coincident counting rates of only one measuring transducer can be compensated by pulse height attenuating circuits, especially in an amplifying circuit. Yet the R relationship may also be influenced by other important factors, e.g., by different amplifier adaptations of the channel inputs. The measuring periods preferably are selected to be of equal duration although the size of the R value may be influenced by the measuring periods, i.e. by the counting time.

Conveniently, the pulse height ranges for the R value determination are chosen to be different from those of the ESCR value determination. In general it is useful to select relatively small pulse height ranges with respect to the energy distribution of the entire spectrum to determine the R value. For reasons of channel economy it is, furthermore, convenient to select pulse height range 3 to be the same as pulse height range 4. Conveniently an averaging of the combined signals of the two measuring transducers or a correspondingly chosen weighting in the circuit is provided in order to obtain an adaptation of the respective pulse heights. If an extreme economizing of channels is important it is also possible to choose pulse height range 3 to be the same as pulse height range 4 which is equal to one of pulse height ranges 1 and 2 of the ESCR value determination. If desired, the adaptation may again be obtained through weighting functions. Alternatively, given channels may rapidly be switched over to other pulse height channels, if necessary, when the R value is to be determined before or after the ESCR value determination.

Different measuring sequences can be applied with the method of the invention in order to be able to determine the individual decisive factors either at greater apparatus expenditure and less time or in a longer period of time at less expenditure for the apparatus. As the method of the invention is easily adaptable to existing apparatus operating according to the external standard procedure, it is possible to apply this method with existing apparatus.

A specific realization of the method according to the invention in a circuit starts from a circuit corresponding to the known ESCR technique. The circuit according to the invention is characterized by an additional connection of only one of the two photomultiplier measuring transducers to a pulse height discriminator stage and subsequent scaler, which connection is likewise evaluated by the coincidence circuit, the output of the scaler also being connected to the computer and readout system.

There are especially preferred circuits corresponding to three preferred measuring sequences, one with reference to a four-channel device, two with reference to a three-channel device and one with reference to a two-channel device, the latter being successively switched to different pulse ranges.

While it is possible in principle, with the circuit arrangement according to the invention to use two different interconnecting circuits for the determination of the ESCR value and of the R value, for instance, in the first case an additive circuit and in the second case a mixer circuit, it is convenient for reasons of apparatus economy to select the first and second interconnecting circuits to be identical.

BRIEF DESCRIPTION OF THE DRAWINGS

The invention, as well as its objects and features, will be better understood by reference to the following detailed description of the invention taken in conjunction with the accompanying drawings in which.

DESCRIPTION OF THE INVENTION

Figure 1:
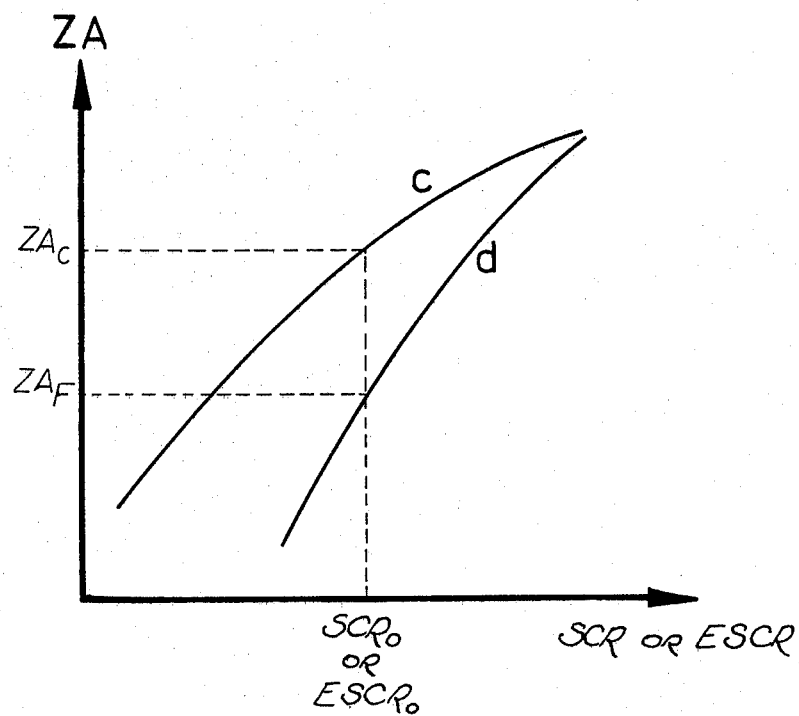
FIG. 1 is a prior art diagram of the counting efficiency ZA plotted versus SCR and ESCR.
Figure 2:
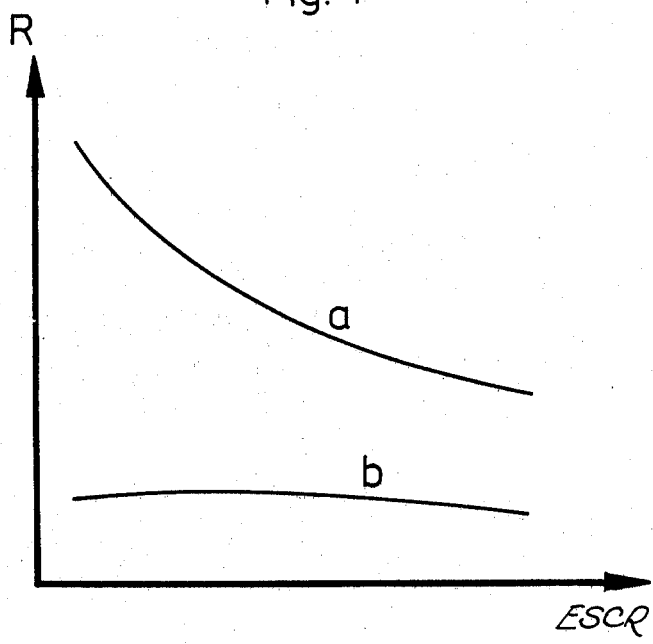
FIG. 2 is a standardized diagram of the R value plotted versus ESCR.
Figure 3:
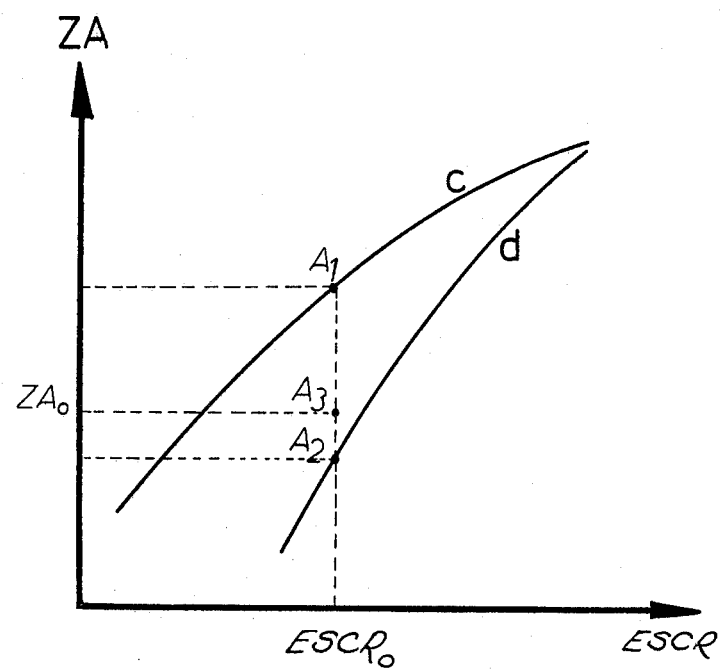
FIG. 3 is a standardized diagram of the counting efficiency ZA plotted versus ESCR, similar to FIG. 1, to illustrate the practical application of the method according to the invention.
Figure 4:
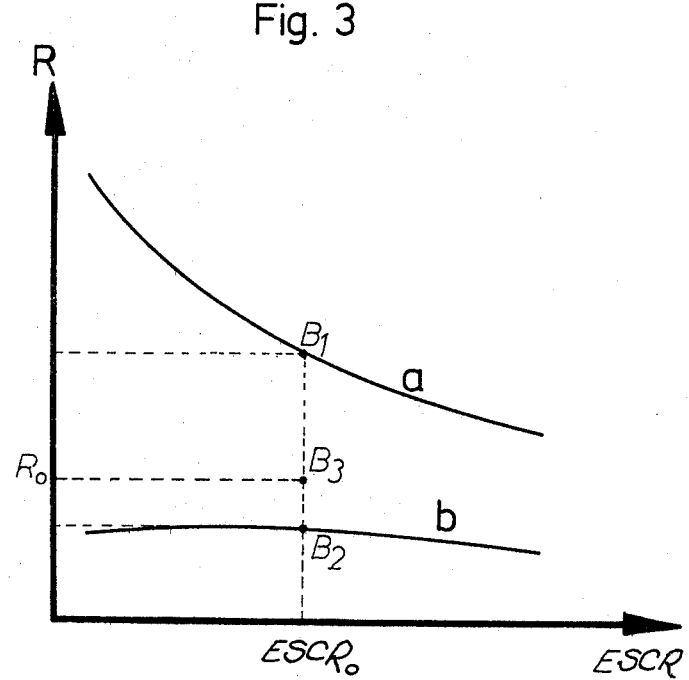
FIG. 4 is a standardized diagram similar to FIG. 2 of the R value plotted versus ESCR, to illustrate the practical application of the method according to the invention.

The SCR and ESCR values of the diagrams of FIGS. 1 to 4 are obtained by taking measurements for a series of samples containing gradually greater amounts of an ingredient known to produce quenching. Two limit or threshold functions each of the counting efficiency ZA are plotted in FIGS. 1 and 3. The upper threshold function, labeled "c" corresponds to the counting efficiencies ZA obtained by using a standard quenching substance which is as purely chemical quenching as possible. A suitable quenching substance, for instance, is $CCl_4$. The lower threshold function labeled "d" corresponds to the counting efficiencies ZA obtained with a substance which provides quenching which is as nearly as possible pure color quenching. A suitable color quenching substance, for instance, is pizeine. FIGS. 2 and 4 show likewise two threshold functions for the R values plotted versus the external standard channels ratio, ESCR. One of the these threshold functions, in this case the lower one, labeled "b" corresponds to the purest possible chemical quenching substance while the other, the upper one labeled "a", corresponds to the purest possible color quenching. The quenching graduations and the quenching agents used are the same as in the case of FIGS. 1 and 3, respectively, and refer to the same sample substances.

Counting efficiency ZA versus external standard channels ratio diagrams according to FIGS. 1 and 3, respectively, are known in the prior art (e.g., J. F. Lang *Organic Scintillators and Liquid Scintillation Counting,* page 823, editors: D. L. Horrocks, C. T. Peng, New York; London, Academic Press, 1971).

The functions according to FIGS. 2 and 4, however, are unique to this invention.

With all other standard samples the procedure used to establish the counting efficiency, ZA vs. external standard channel ratio (ESCR) and the R value vs. external standard channel ratio calibrating ESCR functions (FIGS. 1 and 3) is the same. These calibrating functions are approximated by a polynomial and are stored in a digital computer.

A quench corrected counting efficiency of an unknown sample with any ratio between chemical and color quenching is determined as follows in accordance with the method of the invention. The sample vial or similar container with the unknown amount of radioactivity is introduced into the measuring apparatus, and the desired measuring time is selected and adjusted. After starting the measuring cycle, the external standard channels ratio value and the R value are determined at given measuring times preceding the sample measuring. With these two values determined the sample is measured in its appropriate channel for the allocated measuring time. During this time the computer carries out the following operations. At the color quenched threshold calibrating function $a$ and the chemically quenched threshold calibrating function $b$ in FIG. 4, points $B_1$ and $B_2$ are fixed on $a$ and $b$, respectively, on the basis of the external standard channels ratio value $ESCR_o$ of the unknown sample. Point $B_3$ corresponds to the $R_o$ value of the unknown sample. The distance $B_1 B_2$ and the distance $B_3 B_2$ are calculated and stored in the memory of the computer. Moreover, the external standard channels ratio value $ESCR_o$ of the unknown sample determines points $A_1$ and $A_2$ in the threshold calibrating functions $c$ (chemically quenched) and $d$ (color quenched) of FIG. 3.

The counting efficiency $ZA_o$ corrected in accordance with the invention shown as ordinate $A_3$ is the counting efficiency corrected by distance $A_3 A_2$ which is added to ordinate $A_2$.

The unknown quench corrected counting efficiency $ZA_o$ of the sample (indicated by index zero) is obtained by the following relation:

$$ZA_o = A_2 + \overline{A_3 A_2} = A_2 + \frac{\overline{A_1 A_2} \cdot \overline{B_3 B_2}}{\overline{B_1 B_2}} \tag{6}$$

Finally, the sample counting rate found is computed with the corrected counting efficiency so as to obtain the decay rate of the unknown sample.

The function $R = f$ (ESCR) is independent of the sample nuclide. Surprisingly it has been discovered that the correction according to the invention can be transferred by interpolation of the R vs. ESCR function to $ZA = f$ (ESCR) functions, regardless of the fact to which nuclide the ZA vs. ESCR function applies and leads to the desired correction. In the decay rate determination of multiple-labeled samples, three or more quench correction functions are needed. If desired, the correction of these functions with color quenched and/or chemically quenched samples also may be made in the same manner as with the method of the invention described for the single-labeled sample.

Figure 5:
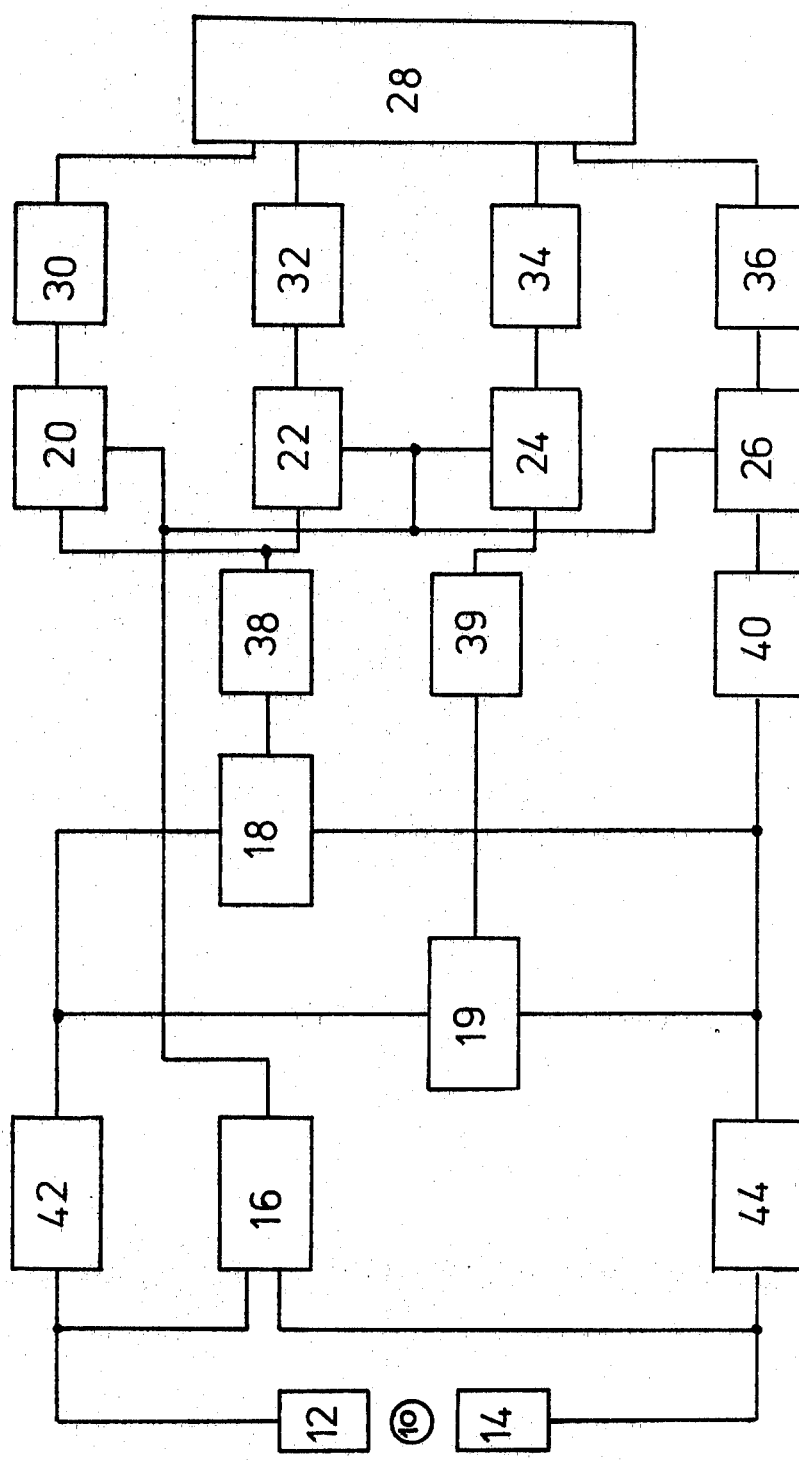
FIGS. 5 to 7 are block diagrams of three alternative embodiments of circuits for carrying out the method according to the invention, FIG. 6a showing a variant of the circuit shown in FIG. 6.
Figure 6:
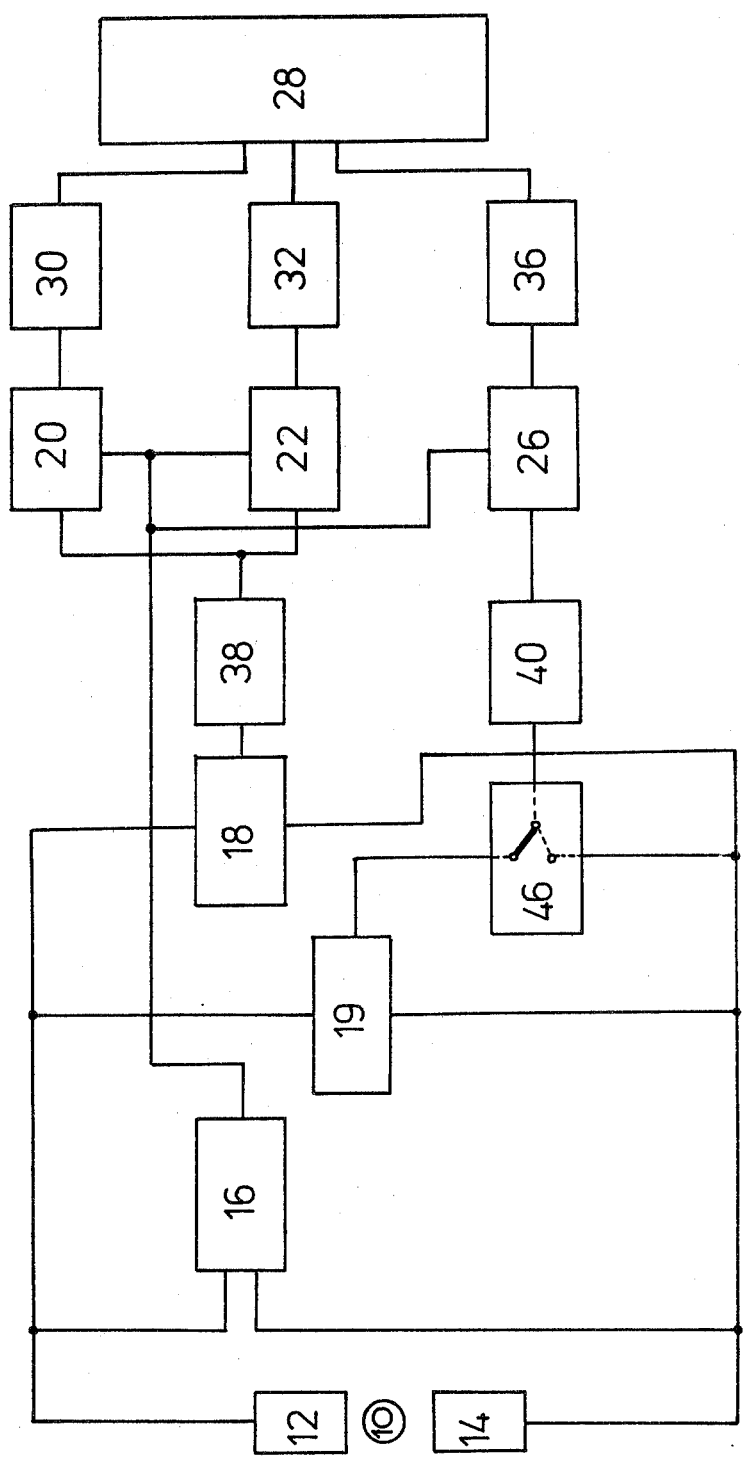
Figure 7:
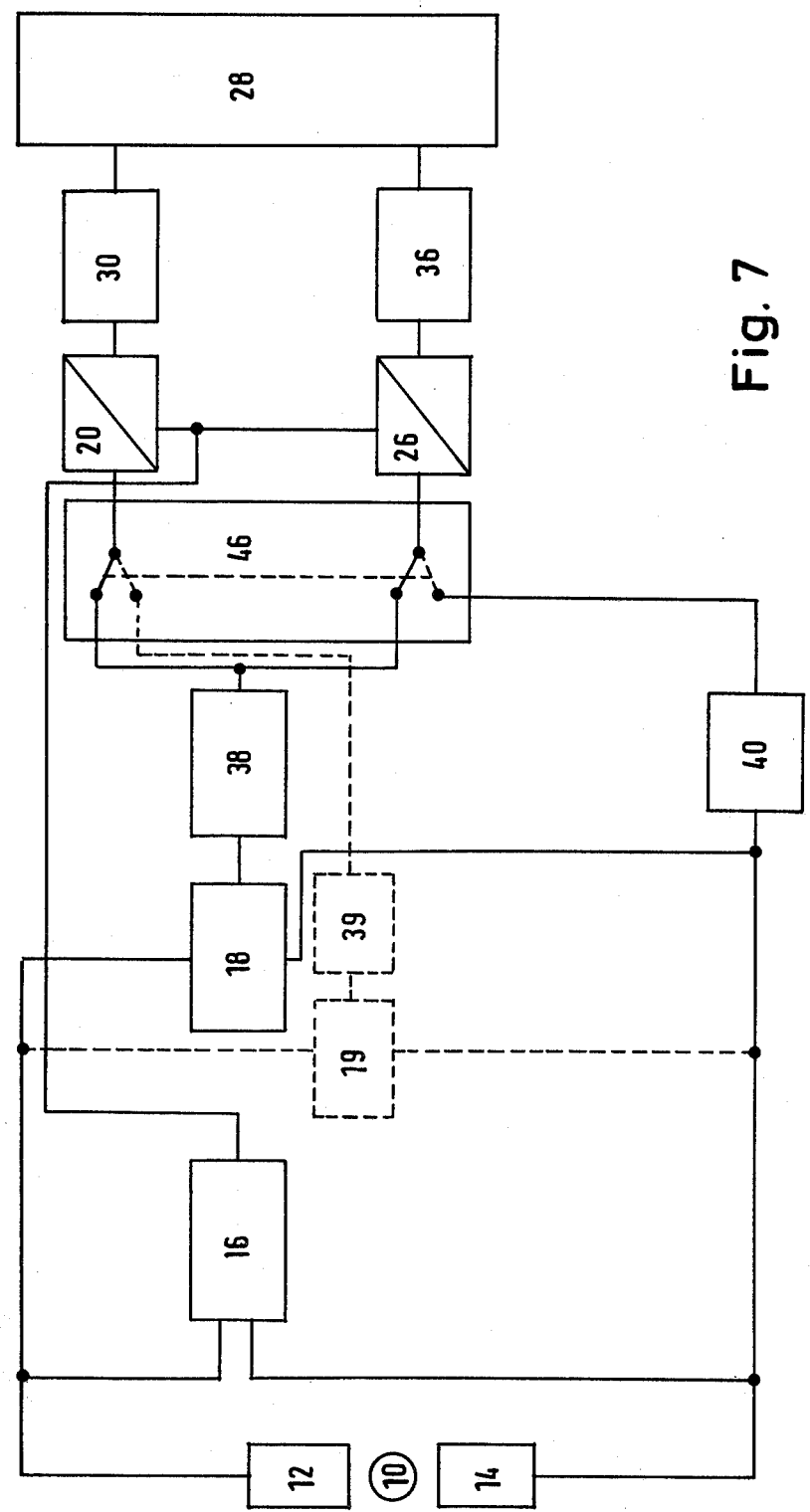

In all three block diagrams of FIGS. 5 to 7 one photomultiplier each, 12 and 14, respectively, is directed from diametrically opposite sides to a sample container 10, usually a sample vial containing an unknown sample. Two kinds of signals are derived from the two photomultipliers 12, 14, yet they are always both evaluated by a coincidence circuit 16. The first kind of signal combines the output signals of the two photomultipliers 12 and 14 in an arithmetic interconnecting unit 18, e.g., a linear circuit with signal amplitude addition or amplitude averaging. The second kind of signal is derived from only one of the two photomultipliers 12 and 14. In the circuits shown this is always photomultiplier 14.

Both kinds of signals are routed to associated amplifiers, if desired, through adapter members or impedance coupling circuits. With all three alternatives illustrated a different number of given discriminators or channels in the apparatus are fed by the amplifiers, four channels being provided in the circuit according to FIG. 5, three channels with the circuit according to FIGS. 6 and 6a, and two channels with the circuit according to FIG. 7, the latter, however, having a sequential switch-over capability to different pulse height ranges. FIGS. 5, 6, 6a and 7 will be described in more detail below.

In FIG. 5 the four pulse height discriminator stages or channels are indicated by reference numerals 20, 22, 24, and 26, respectively. Each channel is followed by a scaler circuit 30, 32, 34, and 36, respectively. The outputs of these scalers are all connected to a computer and readout system 28.

Channels 20 and 22 are connected by way of an amplifier 38, preferably a logarithmic amplifier, to the arithmetic inter-connecting circuit 18 and serve for simultaneous determination of an external standard channels ratio value, the ratio of which is computed in system 28.

It is an advantage of the four-channel device according to FIG. 5 that the R value can be determined simultaneously with the ESCR value. To this end a second inter-connecting circuit 19 is provided in addition to the arithmetic interconnecting circuit 18 and likewise combines the two output signals of the photomultiplier pair 12, 14 and passes them on to channel 24 via an associated further amplifier 39, preferably again a logarithmic amplifier.

In a simpler embodiment the two arithmetic interconnecting circuits 18 and 19 may be united in a single unit which is followed by only one associated amplifier instead of the amplifier pair 38, 39.

For determining the R value the signal of photomultiplier 14 is passed by way of a separate amplifier 40 to the fourth channel 26. Amplifier 40 preferably is a linear amplifier.

If desired, the photomultiplier signals may be coupled by impedance coupling circuits 42 and/or 44 to the subsequent circuits. Such impedance coupling circuits may also be used with the block diagrams to be described below and shown in FIGS. 6 and 7 where they have been left out for the sake of simplicity and because they are not absolutely required.

The alternative block diagram of a circuit according to FIG. 6 comprises only three pulse height discriminators or channels 20, 22, and 26 each followed by a scaler 30, 32, and 36, respectively, which in turn are all connected to the computer and readout system 28.

Channels 20 and 22 of this diagram have the same function as the same channels 20 and 22 in the case of FIG. 5, namely to simultaneously determine the ESCR value. Both channels, therefore, are coupled as in FIG. 5 through the first arithmetic interconnecting circuit 18 and the respective amplifier 38 which is preferably a logarithmic amplifier.

Channel 26 in this case (FIG. 6) performs the function of channel 24, of FIG. 5 by being coupled through its associated, preferably linear, preamplifier 40 directly to photomultiplier 14, as in FIG. 5. If desired, an impedance coupling circuit may be connected in between, likewise as in FIG. 5. The signal path, however, extends via a switching circuit 46 by which channel 26 is connected via amplifier 40 alternatively to a second arithmetic interconnecting circuit 19 processing in coincidence the two signals of the photomultiplier pair 12, 14 in coincidence circuit 16. Channel 26 may be capable of being switched-over in its pulse height range, for example, when interconnecting circuit 19 is an adding circuit. If it is an averaging unit, the switch-over capability may be eliminated.

With this circuit one channel is eliminated, yet a switching circuit 46 is required in the additional connection from photomultiplier 14 to channel 26 and, if desired, switch-over of channel 26, thus requiring additional measuring time in the determination of the R value. This circuit is specifically provided for the very widely used three-channel pulse height analyzer.

Also with the circuit of FIG. 6 the function of the two interconnecting circuits 18 and 19 may be performed by a single unit. However, two amplifiers 38 and 40 are still required since channel 26, as in FIG. 5, must be connected by an additional connection with the photomultiplier 14 in order to process the coincident signal of only one photomultiplier.

Figure 6A:
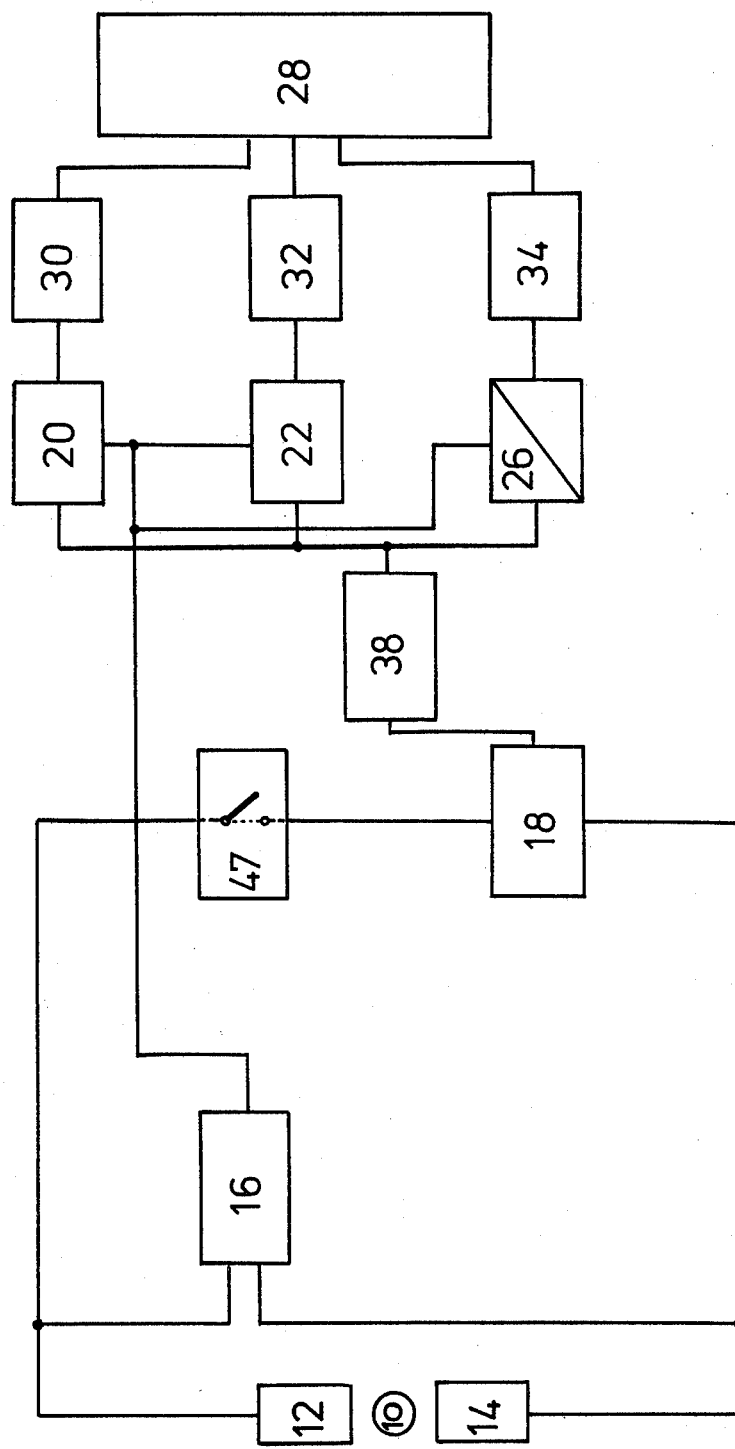

A variant of the circuit according to FIG. 6 is shown in FIG. 6a and comprises elements 10 to 16 and 20 to 36 in unchanged circuitry, yet with the special feature that the possibility of change-over of the pulse height range has particularly been provided for channel 26, as demonstrated by the diagonal line. The alternative already considered in the discussion of FIG. 6, namely to provide only a single interconnecting circuit 18 to perform the function of the second arithmetic interconnecting circuit 19 of the circuit arrangement of FIG. 6 is embodied in FIG. 6a.

Further simplification is obtained by the fact that only one preamplifier 38 is provided which, at the same time, fulfills the function of preamplifier 40 according to FIG. 6. This simplification on the part of the preamplifiers is made possible because the switching circuit 46 of FIG. 6 is replaced by a switching circuit 47 connected in the input line of arithmetic interconnecting circuit 18 connected to photomultiplier 12 yet downstream of the point where coincidence circuit 16 is connected to the connection between the output of photomultiplier 12 and the input of arithmetic interconnecting circuit 18. Thus similar determination of the two combined counting rates for determining the ESCR value and additionally of the combined counting rate for determining the R value in a common first measuring period and of the counting rate of photomultiplier 14 measured in coincidence in the second measuring period only can be effected with yet a simpler circuit of FIG. 6a than according to FIG. 6.

The circuit according to FIG. 7, finally, can the necessary measurements according to the methods of this invention with only two pulse height discriminators, 20 and 26, both shown to be capable of switch-over as to pulse height range by the conventional diagonal line. Both channels 20 and 26, as before, are connected by scalers 30 and 36, respectively, to a digital computer and readout system 28.

This circuit likewise comprises a switching circuit 46 for alternate connection of the first pulse height channels of the two discriminators 20 and 26 to the first interconnecting circuit 18, by way of the amplifier 38 preferably logarithmic, or of the second channel of the one pulse height discriminator 20 to the second arithmetic interconnecting circuit 19, by way of the amplifier 39 (likewise preferably logarithmic) and the second channel of the second pulse height discriminator 26 to the additional connection, by way of the preferably linear amplifier 40, to the photomultiplier 14 connected in coincidence but used for measurements of its signals alone.

It has been expressly shown by dashed lines that the second arithmetic interconnecting circuit 19 and amplifier 39 may be eliminated, if desired. The adapting circuits may be added accordingly.

By "first" and "second" channel of discriminators 20 and 26 in connection with FIG. 7 indistinct reference was made in the above description to the two different pulse height ranges of only one pulse height discriminator each. In connection with FIGS. 5 and 6 they were simply named channels, the position and width of which, however, are adjustable in a conventional manner, a possibility made use of according to the respective purpose.

It will be understood that while the invention has been shown and described with reference to preferred embodiments, changes may be made without departing from the scope of the invention as defined in the following claims.

What is claimed is:

1. A method of determining the quench corrected counting efficiency ZA of electron emitting samples having an undetermined proportion of chemical and color quenching in a liquid scintillation counter using an external standard, by measuring in two different pulse height ranges 1 and 2 counting rates $^2E_1^e$ and $^2E_2^e$ of the sample together with the Compton spectrum caused by the external standard from coincident and additionally arithmetically combined output signals of at least two measuring transducers directed to the sample from different directions, and establishing therefrom by quotient formation the gross ESCR value $^2E_1^e/^2E_2^e$ from which the counting efficiency ZA is derived with the aid of a standardized ZA vs. ESCR threshold curves, characterized in that, in an allocated pulse height range 3 a counting rate $^2E_3^e$ of the sample is measured together with the Compton spectrum caused by the external standard and in an allocated pulse height range 4 a counting rate $^1E_4^e$ of the sample is measured together with the Compton spectrum caused by the external standard and that therefrom the gross R value $^2E_3^e/^1E_4^e$ is formed, and with the aid of a standardized R-ESCR dependency field between threshold functions of an R-ESCR dependence for pure color quenching and an R-ESCR dependence for pure chemical quenching the point associated with the ESCR value formed as well as with the R value formed is determined, in that with the ESCR value formed in the standardized R-ESCR dependency field the ratio of the R differences between the difference of the R value of one of the threshold functions on the one hand and the difference of the R values of both threshold functions on the other hand is determined, and in that with the ESCR value formed the quench corrected counting efficiency ZA is formed with the aid of a standardized ZA vs. ESCR dependency field between threshold functions for pure color quenching and for pure chemical quenching by interpolation according to the ratio of the R differences determined.

2. The method of claim 1 wherein the measuring transducers are directed toward the sample from diametrically opposed directions.

3. The method of claim 1 wherein the output signals of the two measuring transducers supplied to pulse height range 3 are directed differently than the output signals of only one measuring transducer which is supplied to pulse height range 4.

4. The method of claim 1 wherein the pulse height range 3 is selected to be the same as pulse height range 4.

5. The method of claim 1 wherein the pulse height ranges 3 and 4 are selected to be different from pulse height ranges 1 and 2.

6. The method as claimed in claim 1 wherein the pulse height range 3 is selected to be the same as pulse height range 4 being the same as one of pulse height ranges 1 or 2.

7. The method of claim 1 wherein measurement of the sample with the external standard, all counting rates needed for formation of the ESCR value and of the R value are measured simultaneously in a first measuring phase.

8. The method of claim 1 wherein when measuring the sample with the standard, all coincident and combined counting rates $^2E_1^e$, $^2E_2^e$, $^2E_3^e$ of both measuring transducers are measured in a first measuring phase and the coincident counting rate $^1E_4^e$ of the one measuring transducer is measured in a second measuring phase.

9. The method of claim 1 wherein when measuring the sample with the standard, the coincident and combined counting rates of both measuring transducers for the determination of the ESCR value $^2E_1^e$ and $^2E_2^e$ are measured in a first measuring phase, the coincident and combined counting rate $^2E_3^e$ of both measuring transducers for determination of the R value is measured simultaneously with the coincident counting rate $^1E_4^e$ of the one measuring transducer for determination of the R value in a second measuring phase.

10. The method of claim 1 wherein when measuring the sample with the standard, the coincident and combined counting rates of both measuring transducers for the determination of the ESCR value $^2E_1^e$ and $^2E_2^e$ are measured in a first measuring phase, the coincident and combined counting rate $^2E_3^e$ of both measuring transducers for determination of the R value is measured in a second measuring phase, and the coincident counting rate $^1E_4^e$ of the one measuring transducer for determination of the R value is measured in a third measuring phase.

11. The method claim 1 wherein all measuring phases are selected to be of the same duration.

12. A method of determining the quench corrected counting efficiency ZA of electron emitting samples having an undetermined proportion of chemical and color quenching in a liquid scintillation counter using an external standard, by measuring in two different pulse height ranges 1 and 2 counting rates $^2E_1^e$ and $^2E_2^e$ of the sample together with the Compton spectrum caused by the external standard and also counting rates $^2E_1$ and $^2E_2$ of the sample alone, from coincident and arithmetically combined output signals of at least two measuring transducers directed to the sample from different directions, and establishing therefrom by quotient formation the net ESCR value $(^2E_1^e - {}^2E_1)/(^2E_2^e - {}^2E_2)$ from which the counting efficiency ZA is derived with the aid of a standardized ZA vs. ESCR threshold curves characterized in that, in an allocated pulse height range 3 a counting rate $^2E_3^e$ of the sample is measured together with the Compton spectrum caused by the external standard and also a counting rate $^2E_3$ of the sample alone from coincident and arithmetically combined output signals of at least two measuring transducers, in that in an allocated pulse height range 4 a counting rate $^1E_4^e$ of the sample is measured together with the Compton spectrum caused by the external standard and also a counting rate $^1E_4$ of the sample alone from output signals of one of the measuring transducers only which are coincident with output signals of the other two measuring transducers, in that therefrom, the net R value $(^2E_3^e - {}^2E_3)/(^1E_4^e - {}^1E_4)$ is formed, and by means of a standardized R-ESCR dependency field between threshold functions of an R-ESCR dependence for pure color quenching and an R-ESCR dependence for pure chemical quenching, the point associated with the ESCR value formed as well as with the R value formed is determined, in that with the ESCR value formed in the standardized R-ESCR dependency field the ratio of the R differences between the difference of the R value of one of the threshold functions on the one hand and the difference of the R values of both threshold functions on the other hand is determined, and in that with the ESCR value formed the quench corrected counting efficiency ZA is formed with the aid of a standardized ZA vs. ESCR dependency field between threshold functions for pure color quenching and for pure chemical quenching by interpolation according to the ratio of the R differences determined.

13. The method of claim 12 wherein the measuring transducers are directed toward the sample from diametrically opposed directions.

14. The method of claim 12 wherein the output signals of the two measuring transducers supplied to pulse height range 3 are directed differently than the output signals of only one measuring transducer which is supplied to pulse height range 4.

15. The method of claim 12 wherein the pulse height range 3 is selected to be the same as pulse height range 4.

16. The method of claim 12 wherein the pulse height ranges 3 and 4 are selected to be different from pulse height ranges 1 and 2.

17. The method as claimed in claim 12, wherein the pulse height range 3 is selected to be the same as pulse height range 4 being the same as one of pulse height ranges 1 or 2.

18. The method of claim 12 wherein in measurement of the sample with the external standard, all counting rates needed for formation of the ESCR value and of the R value are measured simultaneously in a first measuring phase and when measuring the sample alone, are measured simultaneously in a second measuring phase.

19. The method of claim 12 wherein when measuring the sample with the standard, all coincident and combined counting rates $^2E_1^e$, $^2E_2^e$, $^2E_3^e$ of both measuring transducers are measured in a first measuring phase and the coincident counting rate $^1E_4^e$ of the one measuring transducer is measured in a second measuring phase and, when measuring the sample alone, the coincident and combined counting rates $^2E_1$, $^2E_2$, and $^2E_3$ of both measuring transducers are measured in a third measuring phase and the coincident counting rate $^1E_4$ of the one measuring transducer is measured in a fourth measuring phase.

20. The method of claim 12 wherein when measuring the sample with the standard, the coincident and combined counting rates of both measuring transducers for the determination of the ESCR value $^2E_1^e$ and $^2E_2^e$ are measured in a first measuring phase, the coincident and combined counting rate $^2E_3^e$ of both measuring transducers for determination of the R value is measured simultaneously with the coincident counting rate $^1E_4^e$ of the one measuring transducer for determination of the R value in a second measuring phase and, when measuring the sample alone, the coincident and combined counting rates of both measuring transducers for the determination of the ESCR values $^2E_1$ and $^2E_2$ are measured in a third measuring phase and the coincident and combined counting rate $^2E_3$ of both measuring transducers for determination of the R value is measured simultaneously with the coincident counting rate $^1E_4$ of one measuring transducer for determination of the R value in a fourth measuring phase.

21. The method of claim 12 wherein when measuring the sample with the standard, the coincident and combined counting rates of both measuring transducers for the determination of the ESCR value $^2E_1^e$ and $^2E_2^e$ are measured in a first measuring phase, the coincident and combined counting rate $^2E_3^e$ of both measuring transducers for determination of the R value is measured in a second measuring phase, and the coincident counting rate $^1E_4^e$ of the one measuring transducer for determination of the R value is measured in a third measuring phase, and when measuring the sample alone, the coincident and combined counting rates of both measuring transducers for the determination of the ESCR value $^2E_1$ and $^2E_2$ are measured in a fourth measuring phase and the coincident and combined counting rate $^2E_3$ of both measuring transducers for determination of the R value is measured in a fifth measuring phase and the coincident counting rate $^1E_4$ of the one measuring transducer for determination of the R value is measured in a sixth measuring phase.

22. The method of claim 12 wherein all measuring phases are selected to be of the same duration.

23. A method of determining the quench corrected counting efficiency ZA of an electron emitting sample having an undetermined proportion of chemical and color quenching in a liquid scintillation counter with the aid of a standardized threshold function, ZA vs. ESCR, one threshold function being for pure color quenching and another threshold function being for pure chemical quenching, the parameter ESCR being defined as the gross value, $^2E_1^e/^2E_2^e$, where $^mE_n^e$ represents the counting rate per minute of $m$ coincidence coupled photomultipliers from $n$ different channels provided simultaneously for scintillation measurement of an energy source to which an external standard energy source has been added, thereby yielding a pulse height range $n$, the method comprising the steps of, determining two standardized R vs. ESCR threshold functions, one threshold function being for pure color quenching and another threshold function being for pure chemical quenching, the term R being defined as the gross value $^2E_3^e/^1E_4^e$ according to the same notation a for the parameter ESCR, measuring the gross value $R_o$ and the gross value of $ESCR_o$ for the sample, determining at the measured value $R_o$, $ESCR_o$ a first ordinate distance between $R_o$ and a first one of the threshold functions, and a second ordinate distance between the first and second threshold functions, calculating an ordinate distance ratio of said first ordinate distance and said second ordinate distance, and determining a quench corrected counting efficiency ZA from said standardized threshold functions evaluated at the abscissa $ESCR_o$, by algebrically adding to the ordinate value $ZA_{A1}$ evaluated at the first threshold function corresponding to said first threshold function of the standardized R vs. ESCR, an ordinate distance equal to the product of said ordinate distance ratio and the ordinate distance between the first and second threshold function of the standardized ZA vs. ESCR evaluated at $ESCR_o$.

24. A method of determining the quench corrected counting efficiency ZA of an electron emitting sample having an undetermined proportion of chemical and color quenching in a liquid scintillation counter with the aid of a standardized threshold function, ZA vs. ESCR, one threshold function being for pure color quenching and another threshold function being for pure chemical quenching, the parameter ESCR being defined as the net value, $^2E_1^3 - {^2E_1}/{^2E_2^e} - {^2E_2}$, where $^mE_n^e$ represents the counting rate per minute of $m$ coincidence coupled photomultipliers from $n$ different channels provided simultaneously for scintillation measurement of energy source to which an external standard energy source has been added thereby yielding a pulse height range $n$, the method comprising the steps of, determining two standardized R vs. ESCR threshold functions, one threshold function being for pure color quenching and a another threshold function being for pure chemical quenching, the term R being defined as the net value $^2E_3^e - {^2E_3}/{^1E_4^e} - {^1E_4}$ according to the same notation for the parameter ESCR, measuring the net value $R_o$ and the net value of $ESCR_o$ for the sample, determining at the measured value $R_o$, $ESCR_o$ a first ordinate distance between $R_o$ and a first one of the threshold functions, and a second ordinate distance between the first and second threshold functions, calculating an ordinate distance ratio of said first ordinate distance and said second ordinate distance, and determining a quench corrected counting efficiency ZA from said standardized threshold functions evaluated at the abscissa $ESCR_o$, by algebrically adding to the ordinate value $ZA_{A1}$ evaluated at the first threshold function corresponding to said first threshold function of the standardized R vs. ESCR, an ordinate distance equal to the product of said ordinate distance ratio and the ordinate distance between the first and second threshold function of the standardized ZA vs. ESCR evaluated at $ESCR_o$.

25. Apparatus for determining the quench corrected counting efficiency ZA of electron emitting samples having an undetermined proportion of chemical and color quenching in a liquid scintillation counter using an external standard comprising, at least two photomultiplier measuring transducers directed from different directions to a liquid scintillator measuring location, said transducers respectively being the source of first and second transducer signals, a coincidence circuit responsive to said first and second transducer signals, said coincidence circuit generating a coincidence signal when said first and second transducer signals are simultaneously present, a first arithmetic interconnecting circuit means responsive to said first and second transducer signals for generating a first arithmetic signal, two pulse height discriminator circuit means, each responsive to said first arithmetic signal and to said coincidence signal for generating first and second discriminator signals, two scalar circuit means, one being provided for each of said pulse height discriminator circuit means, responsive respectively to said first and second discriminator signals, for scaling said discriminator signals and generating first and second scaled signals, an additional pulse height discriminator circuit means, responsive to the first transducer signal and to said coincidence signal for generating a third discriminator signal, an additional scalar circuit means responsive to said third discriminator signal for scaling said third discriminator signal and generating a third scaled signal, and a programed digital computer and readout means, responsive to said first, second and third scaled signals, for generating signals proportional to the quench corrected counting efficiency ZA of said electron emitting samples.

26. The apparatus of claim 25 wherein the photomultiplier measuring transducers are directed to the measuring location from diametrically opposed directions.

27. The apparatus of claim 25 wherein said arithmetic interconnecting circuit is a summing circuit.

28. The apparatus of claim 25 wherein said arithmetic interconnecting circuit is an averaging circuit.

29. The apparatus of claim 25 wherein said pulse height discriminator circuit means responsive only to the first transducer signal and to said coincidence signal is a separate and distinct circuit means from said two pulse height discriminator circuit means each responsive to said first arithmetic signal.

30. The apparatus of claim 25 further comprising,
a second arithmetic interconnecting circuit responsive to said first and second transducer signals, for generating a second arithmetic signal,
an separate pulse height discriminator circuit means responsive to said second arithmetic signal for generating a fourth discriminator signal, and
a scalar circuit means responsive to said fourth discriminator signal for scaling and applying said fourth discriminator signal to said programmed digital computer and readout means.

31. The apparatus of claim 25 further comprising,
a second arithmetic interconnecting circuit means responsive to said first and second transducer signals, for generating a second arithmetic signal, and
a switching circuit means for alternately connecting said additional pulse height discriminator circuit means between said second arithmetic interconnecting circuit means and said first transducer signal.

32. The apparatus of claim 30 wherein said first and second arithmetic interconnecting circuit means are identical.

33. The apparatus of claim 31 wherein said first and second arithmetic interconnecting circuit means are identical.

34. The apparatus of claim 25 further comprising,
a first preamplifier having a first preamplification characteristic connected between said first arithmetic interconnecting circuit means and said two pulse height discriminator circuit means, and
a second preamplifier having a second amplification characteristic which is different from said first amplification characteristic, connected between said additional pulse height discriminator circuit means and the source of said first transducer signal.

35. The apparatus of claim 34 wherein said first amplification characteristic is different from said second amplification characteristic by an amplification factor.

36. Apparatus for determining the quench corrected counting efficiency ZA of electron emitting samples having an undetermined proportion of chemical and color quenching in a liquid scintillation counter using an external standard comprising, at least two photomultiplier measuring transducers directed from different directions to a liquid scintillator measuring location, said transducers respectively being the source of first and second transducer signals, first, second and third pulse height discriminator circuit means, the pulse height range of said third pulse height discriminator circuit means being switched between two different ranges, for generating first, second and third discriminator signals, a coincidence circuit responsive to said first and second transducer signals, said coincidence circuit generating a coincidence signal when said first and second transducer signals are simultaneously present, said coincidence signal being applied to said first, second and third pulse height discriminator circuit means, a switching circuit means being switched in synchronism, with the third pulse height discriminator circuit means for alternately connecting said second source of transducer signals to a first arithmetic interconnecting circuit means, said arithmetic interconnecting circuit means, being continuously connected to said first source of transducer signals, the output of said interconnecting circuit means being connected via a single preamplifier circuit means to the inputs of said first, second and third pulse height circuit means, three scalar circuit means, one being provided for each of said pulse height discriminator circuit means, responsive respectively to said first, second and third discriminator signals, for scaling said discriminator signals and generating first, second and third scaled signals, and a programed digital computer and readout means, responsive to said first, second and third scaled signals, for generating signals proportional to the quench corrected counting efficiency ZA of said electron emitting signals.

37. Apparatus for determining the quench corrected counting efficiency ZA of electron emitting samples having an undetermined proportion of chemical and color quenching in a liquid scintillation counter using an external standard comprising, at least two photomultiplier measuring transducers directed from different directions to a liquid scintillator measuring location, said transducers respectively being the source of first and second transducer signals, first and second pulse height discriminator circuit means, the pulse height range of both being switched between two different pulse height channels, a coincidence circuit responsive to said first and second transducer signals, said coincidence circuit generating a coincidence signal when said first and second transducer signals are simultaneously present, said coincidence signal being applied to said first and second pulse height discriminator circuit means, first and second arithmetic interconnecting circuit means responsive to said first and second transducer signals for generating arithmetic signals, switching circuit means for alternately connecting first the first pulse height channels of both pulse height discriminator circuit means to the first arithmetic interconnecting circuit means, and alternately the second channel of one pulse height discriminator to the second arithmetic interconnecting circuit and the second channel of the second pulse height discriminator to the first source of transducer signals, two scalar circuit means, one being provided for each of said pulse height discriminator circuit means, responsive respectively to said first and second discriminator signals, for scaling said discriminator signals and generating first and second scaled signals, and a programed digital computer and readout means, responsive to said first and second scaled signals, for generating signals proportional to the quench corrected counting effficiency ZA of said electron emitting samples.

* * * * *

UNITED STATES PATENT AND TRADEMARK OFFICE
CERTIFICATE OF CORRECTION

PATENT NO. : 4,085,325
DATED : April 18, 1978
INVENTOR(S) : Khaled Atallah, et al It is certified that error appears in the above-identified patent and that said Letters Patent are hereby corrected as shown below:

Col. 4, line 60, change "$ZA_2.$" to --$ZA_2.$--.

Col. 5, line 28, change "even" to --event--.

Col. 7, line 57, after "is" insert --also--.

Col. 14, line 35, after "method" insert --of--.

Col. 18, line 55, change "preamplification" to --amplification--.

Signed and Sealed this

Twenty-sixth Day of September 1978

[SEAL]

Attest:

RUTH C. MASON
Attesting Officer

DONALD W. BANNER
Commissioner of Patents and Trademarks